(12) United States Patent
Jacobson

(10) Patent No.: US 10,430,839 B2
(45) Date of Patent: Oct. 1, 2019

(54) DISTRIBUTED ADVERTISEMENT INSERTION IN CONTENT-CENTRIC NETWORKS

(71) Applicant: Cisco Technology, Inc., San Jose, CA (US)

(72) Inventor: Van L. Jacobson, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 103 days.

(21) Appl. No.: 13/712,790

(22) Filed: Dec. 12, 2012

(65) Prior Publication Data

US 2014/0164147 A1    Jun. 12, 2014

(51) Int. Cl.
*G06Q 30/02*  (2012.01)
*H04L 29/08*  (2006.01)

(52) U.S. Cl.
CPC ..... *G06Q 30/0277* (2013.01); *G06Q 30/0273* (2013.01); *H04L 67/327* (2013.01)

(58) Field of Classification Search
CPC ....................................................... H04L 29/08
USPC .......................................................... 704/14
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |

(Continued)

FOREIGN PATENT DOCUMENTS

| | | |
|---|---|---|
| DE | 19620817 A1 | 11/1997 |
| EP | 0295727 A2 | 12/1988 |

(Continued)

OTHER PUBLICATIONS

"Digital Signature" archived on Aug. 31, 2009 at http://web.archive.org/web/20090831170721/http://en.wikipedia.org/wiki/Digital_signature.*

(Continued)

*Primary Examiner* — Michael Bekerman
*Assistant Examiner* — Scott Snider

(57) ABSTRACT

One embodiment of the present invention provides a system that facilitates delivery of advertisements over a network. The system includes an affiliate node. During operation, the affiliate node receives a content piece from a content provider. The content piece includes a placeholder link associated with a predetermined advertising slot. The affiliate node modifies the content piece by replacing the placeholder link with an advertisement or a link thereto. Subsequently, the affiliate node receives a request for the content piece from a client, and delivers the modified content piece to the client.

20 Claims, 6 Drawing Sheets

(56) References Cited

U.S. PATENT DOCUMENTS

| | | |
|---|---|---|
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,433,611 B2 * | 4/2013 | Lax ..................... H04N 21/435 |
| | | 705/14.4 |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Paterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0091111 A1 * | 4/2005 | Green ..................... G06Q 30/02 |
| | | 705/14.59 |
| 2005/0144073 A1 * | 6/2005 | Morrisroe .............. G06Q 30/02 |
| | | 705/14.5 |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0242407 A1 * | 10/2006 | Kimmel .............. H04L 63/0428 |
| | | 713/166 |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |

(56) References Cited

U.S. PATENT DOCUMENTS

| | | |
|---|---|---|
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1* | 11/2009 | Jacobson ............ 709/229 |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1* | 10/2011 | Ramer et al. ............ 705/14.66 |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |

(56) References Cited

U.S. PATENT DOCUMENTS

| | | | |
|---|---|---|---|
| 2013/0144728 A1* | 6/2013 | Ruarte | G06Q 30/0277 705/14.73 |
| 2013/0151584 A1 | 6/2013 | Westphal | |
| 2013/0163426 A1 | 6/2013 | Beliveau | |
| 2013/0166668 A1 | 6/2013 | Byun | |
| 2013/0173822 A1 | 7/2013 | Hong | |
| 2013/0182568 A1 | 7/2013 | Lee | |
| 2013/0185406 A1 | 7/2013 | Choi | |
| 2013/0197698 A1 | 8/2013 | Shah | |
| 2013/0198119 A1 | 8/2013 | Eberhardt, III | |
| 2013/0219038 A1 | 8/2013 | Lee | |
| 2013/0219081 A1 | 8/2013 | Qian | |
| 2013/0219478 A1 | 8/2013 | Mahamuni | |
| 2013/0223237 A1 | 8/2013 | Hui | |
| 2013/0227166 A1 | 8/2013 | Ravindran | |
| 2013/0242996 A1 | 9/2013 | Varvello | |
| 2013/0250809 A1 | 9/2013 | Hui | |
| 2013/0282854 A1 | 10/2013 | Jang | |
| 2013/0282860 A1 | 10/2013 | Zhang | |
| 2013/0282920 A1 | 10/2013 | Zhang | |
| 2013/0304937 A1 | 11/2013 | Lee | |
| 2013/0329696 A1 | 12/2013 | Xu | |
| 2013/0336323 A1 | 12/2013 | Srinivasan | |
| 2013/0343408 A1 | 12/2013 | Cook | |
| 2014/0003232 A1 | 1/2014 | Guichard | |
| 2014/0006565 A1 | 1/2014 | Muscariello | |
| 2014/0029445 A1 | 1/2014 | Hui | |
| 2014/0032714 A1 | 1/2014 | Liu | |
| 2014/0040505 A1 | 2/2014 | Barton | |
| 2014/0074730 A1 | 3/2014 | Arensmeier | |
| 2014/0075567 A1 | 3/2014 | Raleigh | |
| 2014/0082135 A1 | 3/2014 | Jung | |
| 2014/0089454 A1 | 3/2014 | Jeon | |
| 2014/0096249 A1 | 4/2014 | Dupont | |
| 2014/0129736 A1 | 5/2014 | Yu | |
| 2014/0136814 A1 | 5/2014 | Stark | |
| 2014/0140348 A1 | 5/2014 | Perlman | |
| 2014/0143370 A1 | 5/2014 | Vilenski | |
| 2014/0146819 A1 | 5/2014 | Bae | |
| 2014/0149733 A1 | 5/2014 | Kim | |
| 2014/0156396 A1 | 6/2014 | deKozan | |
| 2014/0165207 A1 | 6/2014 | Engel | |
| 2014/0172783 A1 | 6/2014 | Suzuki | |
| 2014/0172981 A1 | 6/2014 | Kim | |
| 2014/0173034 A1 | 6/2014 | Liu | |
| 2014/0192717 A1 | 7/2014 | Liu | |
| 2014/0195328 A1 | 7/2014 | Ferens | |
| 2014/0195666 A1 | 7/2014 | Dumitriu | |
| 2014/0233575 A1 | 8/2014 | Xie | |
| 2014/0237085 A1 | 8/2014 | Park | |
| 2014/0280823 A1 | 9/2014 | Varvello | |
| 2014/0281489 A1 | 9/2014 | Peterka | |
| 2014/0281505 A1 | 9/2014 | Zhang | |
| 2014/0282816 A1 | 9/2014 | Xie | |
| 2014/0289325 A1 | 9/2014 | Solis | |
| 2014/0289790 A1 | 9/2014 | Wilson | |
| 2014/0314093 A1 | 10/2014 | You | |
| 2014/0365550 A1 | 12/2014 | Jang | |
| 2015/0006896 A1 | 1/2015 | Franck | |
| 2015/0018770 A1 | 1/2015 | Baran | |
| 2015/0032892 A1 | 1/2015 | Narayanan | |
| 2015/0063802 A1 | 3/2015 | Bahadur | |
| 2015/0095481 A1 | 4/2015 | Ohnishi | |
| 2015/0095514 A1 | 4/2015 | Yu | |
| 2015/0188770 A1 | 7/2015 | Naiksatam | |

FOREIGN PATENT DOCUMENTS

| | | | |
|---|---|---|---|
| EP | 0757065 A2 | 7/1996 | |
| EP | 1077422 A2 | 2/2001 | |
| EP | 1384729 A1 | 1/2004 | |
| EP | 2124415 A2 | 11/2009 | |
| EP | 2214357 A1 | 8/2010 | |
| WO | 03005288 A2 | 1/2003 | |
| WO | 03042254 A1 | 5/2003 | |
| WO | 03049369 A2 | 6/2003 | |
| WO | 03091297 A1 | 11/2003 | |
| WO | 2007113180 A1 | 10/2007 | |
| WO | 2007144388 A1 | 12/2007 | |
| WO | 2011049890 A1 | 4/2011 | |

OTHER PUBLICATIONS

"Content Delivery Network", Wikipedia, Dec. 10, 2011, http://en.wikipedia.org/w/index.php?title=Content_delivery_network&oldid=465077460.*

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Lynn. The Pairing-Based Cryptography Library, http://crypto.stanford.edu/pbc/.

C. Gentry and A. Silverberg. Hierarchical ID-Based Cryptography. Advances in Cryptology—ASIACRYPT 2002. Springer Berlin Heidelberg (2002).

D. Boneh, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.

D. Boneh and M. Franklin. Identity-Based Encryption from the Weil Pairing. Advances in Cryptology—CRYPTO 2001, vol. 2139, Springer Berlin Heidelberg (2001).

G. Ateniese, K. Fu, M. Green, and S. Hohenberger. Improved Proxy Reencryption Schemes with Applications to Secure Distributed Storage. In the 12th Annual Network and Distributed System Security Symposium (2005).

H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digital Rights Management using Broadcast Encryption. Proceedings of the IEEE 92.6 (2004).

J. Shao and Z. Cao. CCA-Secure Proxy Re-Encryption without Pairings. Public Key Cryptography. Springer Lecture Notes in Computer Sciencevol. 5443 (2009).

M. Blaze, G. Bleumer, and M. Strauss, 'Divertible protocols and atomic prosy cryptography,' in Proc. EUROCRYPT 1998, Espoo, Finland, May-Jun. 1998, pp. 127-144.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/www.adobe.com/content/dam/Adobe/en/devnet/rtmp/ pdf/rtmp specification 1.0.pdf.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Kamara and K. Lauter. Cryptographic Cloud Storage. Financial Cryptography and Data Security. Springer Berlin Heidelberg (2010).

Sandvine, Global Internet Phenomena Report—Spring 2012. Located online at http://www.sandvine.com/downloads/ documents/ Phenomenal H 2012/Sandvine Global Internet Phenomena Report 1H 2012.pdf.

The Despotify Project (2012). Available online at http://despotify.sourceforge.net/.

V. K. Adhikari, S. Jain, Y. Chen, and Z.-L. Zhang. Vivisecting Youtube:An Active Measurement Study. In INFOCOM12 Mini-conference (2012).

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

(56) References Cited

OTHER PUBLICATIONS

Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A tracedriven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 (2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.

(56) References Cited

OTHER PUBLICATIONS

J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al.,"A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from Dns," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM 88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

(56) References Cited

OTHER PUBLICATIONS

V. Goyal, O. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

D. Trossen and G. Parisis, "Designing and realizing and information-centric internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hogue et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Amadeo et al. "Design and Analysis of a Transport-Level Solution for Content-Centric VANETs", University "Mediterranea" of Reggio Calabria, Jun. 15, 2013.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

\* cited by examiner

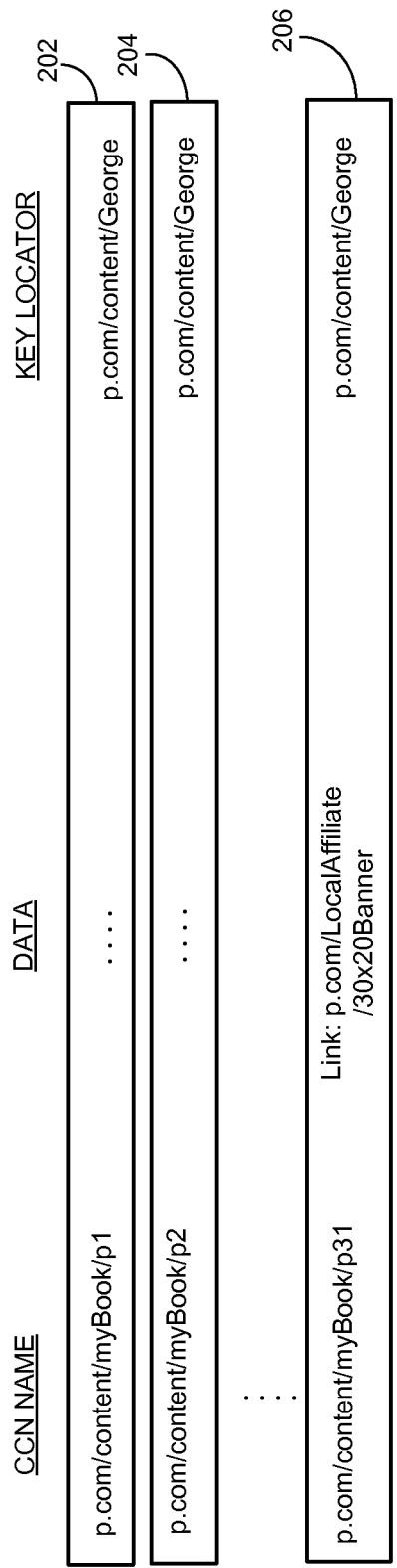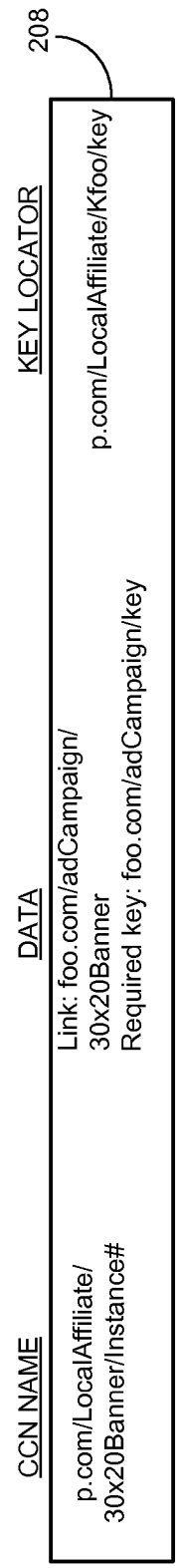
FIG. 2A
FIG. 2B

DISTRIBUTED ADVERTISEMENT INSERTION IN CONTENT-CENTRIC NETWORKS

RELATED APPLICATION

The subject matter of this application is related to the subject matter of the following applications:

U.S. patent application Ser. No. 12/332,560, entitled "METHOD AND APPARATUS FOR FACILITATING COMMUNICATION IN A CONTENT-CENTRIC NETWORK," by inventor Van L. Jacobson, filed 11 Dec. 2008;

U.S. patent application Ser. No. 12/565,005, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009;

U.S. patent application Ser. No. 12/638,478, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, filed 15 Dec. 2009; and U.S. patent application Ser. No. 12/640,968, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009;

the disclosures of which are incorporated by reference in their entirety herein.

FIELD

The present disclosure relates generally to online advertising. More specifically, the present disclosure relates to a method and system for local insertion of online advertisements.

RELATED ART

The proliferation of the Internet and e-commerce continues to fuel revolutionary changes in the network industry. Today, a significant number of information exchanges, from online movie viewing to daily news delivery, retail sales, and instant messaging, are conducted online. Online advertising, delivered to either a personal computer (PC) or a smartphone, has become a large and fast-growing business.

Traditionally, online advertising (or web-based advertising) is implemented in a centralized fashion where advertisement placement is controlled by an advertising service. For example, a typical web page can embed empty spaces, which can be used for banner advertising. These empty spaces are usually sold by the publisher of the web page to a centralized advertisement aggregator, such as an online advertising network, which matches these empty spaces with advertisement demand. Note that such advertising is not localized or customized to viewers of the advertisement, and in general, there is no advertisement incentive to an Internet hosting service provider that hosts the web page. In contrast, a conventional broadcast TV network allows local affiliated states to fill advertisement slots within a piece of content delivered by the broadcaster, thus making it possible for local affiliates to collect advertising revenues. It is desirable to adapt the advertising model used in broadcast TV to the world of online advertising.

SUMMARY

One embodiment of the present invention provides a system that facilitates delivery of advertisements over a network. The system includes an affiliate node. During operation, the affiliate node receives a content piece from a content provider. The content piece includes a placeholder link associated with a predetermined advertising slot. The affiliate node modifies the content piece by replacing the placeholder link with an advertisement or a link thereto. Subsequently, the affiliate node receives a request for the content piece from a client, and delivers the modified content piece to the client.

In one variation on this embodiment, the affiliate node and the client are coupled to each other via a content-centric network (CCN).

In one variation on this embodiment, the affiliate node receives a signing key from the content provider, and produces a signature for the modified content piece using the signing key.

In a further variation, the signature of the modified content piece is verified by the client before the client renders the modified content.

In one variation on this embodiment, the advertisement includes at least one of: a banner, a pop-up window, a video clip, and an audio clip.

One embodiment of the present invention provides a network node that facilitates delivery of advertisements over the network. During operation, the network node delivers a content piece to a client. The content piece is produced by a content producer, and the content piece is embedded with a placeholder link associated with a predetermined advertising slot. The network node subsequently receives a request from the client corresponding to the placeholder link, determines an advertisement or a link thereto that matches the predetermined advertising slot, and forwards the advertisement or the link to the client.

BRIEF DESCRIPTION OF THE FIGURES

FIG. 2A presents a diagram illustrating an exemplary CCN content stream that includes a placeholder link, in accordance with an embodiment of the present invention.

FIG. 2B presents a diagram illustrating an exemplary response to the placeholder-link request from a local affiliate, in accordance with an embodiment of the present invention.

In the figures, like reference numerals refer to the same figure elements.

DETAILED DESCRIPTION

Figure 1:
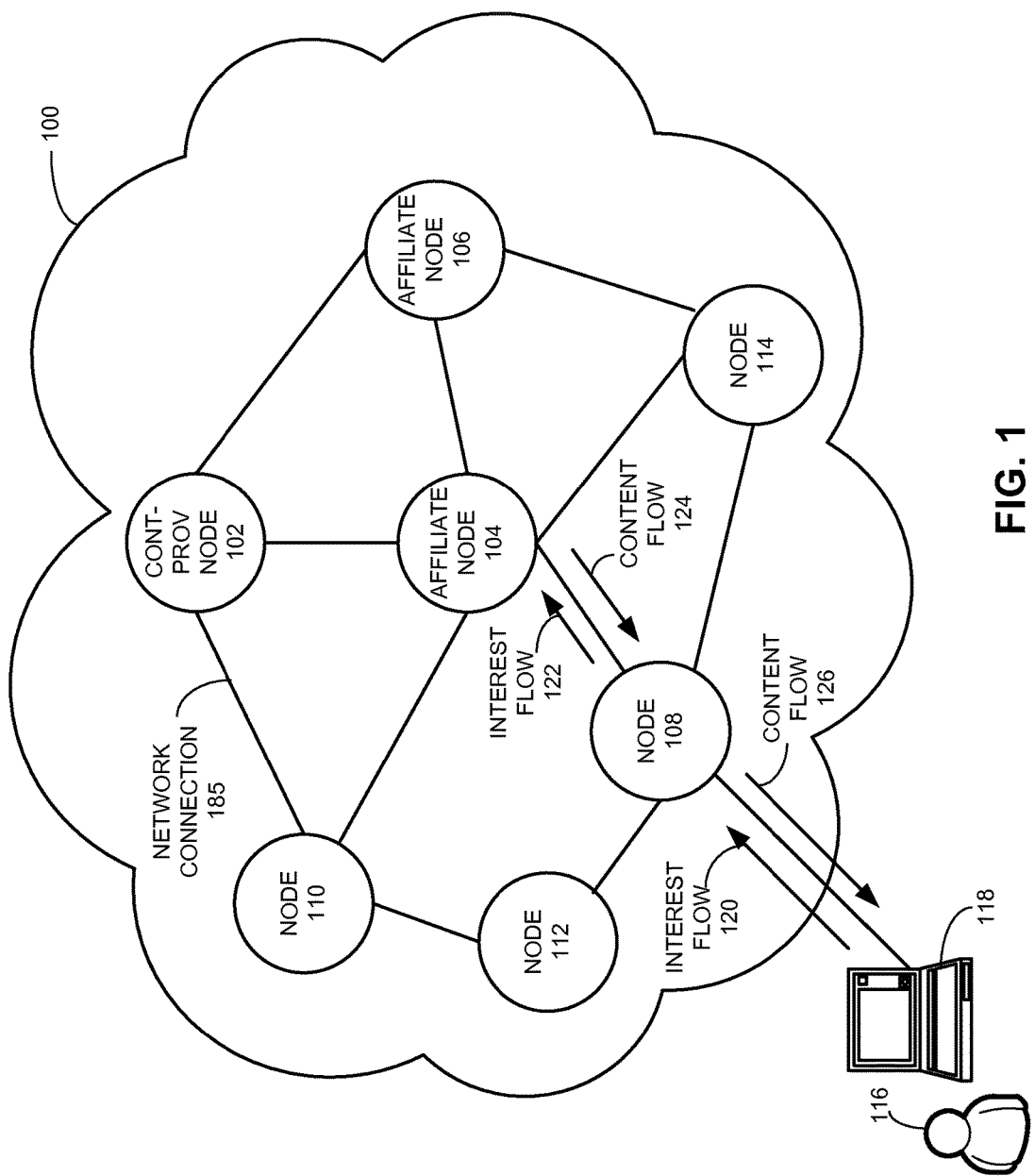
FIG. 1 presents a diagram illustrating an exemplary content delivery network (CDN).

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide a system that allows a local affiliate, such as a local content provider, to insert advertisements into online content before the content is provided to consumers. When a content provider generates or provides content (in the form of web pages, streaming media, or other forms) to be distributed over the network, the content provider can insert a "placeholder" link within the content. A content consumer retrieves desired content via, for example, a web browser, from a local affiliate that hosts the content. The local affiliate modifies the original content by replacing the "placeholder" link with its own advertising content, such as a link to consumer-specific advertisement. When the web browser renders the retrieved content, it renders the content along with the local affiliate's advertising content. To ensure that the local affiliate is permitted by the content provider to make such modification, the content provider signs the original content with a signing key, and provides the signing key to legitimate local affiliates. After a legitimate local affiliate replaces the "placeholder" link with its own advertising link, it signs the modified content using the key provided by the content provider. Before rendering the local affiliate's advertising content, the content consumer's machine verifies whether the modified content is properly signed by the signing key issued by the content provider.

Although the instant disclosure is presented using examples based on a content-centric network (CCN), embodiments of the present invention are not limited to CCNs.

Content-Centric Networks (CCNs)

Content-centric networks (CCNs) bring a new approach to content transport. Instead of having network traffic viewed at the application level as end-to-end conversations over which content travels, in a CCN, content is requested or returned based on its unique name, and the network is responsible for routing content from the provider to the consumer. Unlike IP addresses, a content name does not necessarily indicate the location of the content. CCN names are opaque, binary objects that include an explicitly specified number of components. In addition, CCN names are persistent and content-specific. That is, if one changes the content of a file or data object, the content is effectively associated with a new name. This persistency can be achieved with an explicit versioning mechanism where, for example, the new content can be "version 4" of a given name. The version is often a timestamp. The persistency can also be achieved implicitly. For example, contents can be associated with not only their human-established names but also with authentication metadata (e.g., a digital signature by the publisher of the content). As a result, the complete content name changes when the data associated with a given name changes.

In a content-centric network (CCN), communication is driven by the consumers of data. In a CCN, there are two packet types, interest and data. An interest packet (also called a "query") is a request for some content. An interest packet encodes a special form of query that expresses what content is desired and what content is not desired. A data packet (also called a "content packet") is a unit of content. Data packets are self-identifying by carrying within them their full name. A consumer asks for content by broadcasting its interest over all available connectivity. Any node hearing the interest and having data that satisfies it can respond with a data packet. Data is transmitted only in response to an interest and consumes that interest. Both interest and data identify the content being exchanged by the content name (or CCN name). In one embodiment, data can "satisfy" an interest if the CCN name in the interest packet is a prefix of the CCN name in the data packet. An interest may specify the exact version to retrieve or may specify any version greater than a specified version, known as a "get-the-latest-version interest."

Functionally, a CCN can retain associations among various names and the content which they represent. The names are hierarchically structured, have variable length, and in many situations can be understood by a user. For example, "/abcd/bob/papers/ccn/news" could be the name of an article, i.e., the "news" article from the "ccn" collection of papers for a user named "Bob" at the organization named "ABCD." In a CCN, from an application's perspective, there is no need for a content consumer to determine how to find the "ABCD" organization, or to find which host there holds Bob's CCN publications. In one embodiment, to request a piece of content, a device in the CCN registers with the network that it is interested in that content by its name, and the content, if available in the local network, is routed back to it. The routing infrastructure takes care of intelligently propagating the interest to the prospective publishers, and then carrying any available content back along the path which the interest traversed.

CCNs have additional properties which make them especially appealing. All content can be cryptographically authenticated, meaning that some subset of nodes on the network (e.g., a legitimate querier of the content) can verify the authenticity of a piece of content. CCNs also allow data to be accessed by name, independent of publisher. At the same time, one can tailor a specialized request for data by a certain publisher. For example, one can ask for "foo.txt," or "foo.txt signed by Bob." Any form of self-verifying name can be used as a contract between producer and consumer. It is also possible to use hybrid self-verifying names, where the former components of the name are for organization and efficient routing, and the latter components of the name are self-verifying. Finally, CCNs allow the separation of content and trust, enabling different data consumers to use different mechanisms for establishing trust in the same piece of content. Although content might have been signed by a single publisher, it can be trusted for different reasons. For example, one user might trust a given piece of content because of a direct personal connection with its signer, whereas another user might trust the same content because of the content signer's participation in a Public Key Infrastructure (PKI) which that user has chosen to trust.

Details about the CCN can be found in U.S. patent application Ser. No. 12/332,560, entitled "METHOD AND APPARATUS FOR FACILITATING COMMUNICATION IN A CONTENT-CENTRIC NETWORK," by inventor Van L. Jacobson, filed 11 Dec. 2008, the disclosure of which is incorporated by reference in its entirety herein.

Advertisement Distribution over CCN

FIG. 1 presents a diagram illustrating an exemplary content delivery network (CDN). CDN 100 includes a number of nodes: a content-provider node 102, a number of affiliate nodes (such as an affiliate node 104 and an affiliate node 106), and a number of other network nodes (such as nodes 108, 110, 112, and 114). CDN 100 can be any type of network that is capable of delivering content, such as web pages, objects for downloading (media files, software, and documents), applications, live streaming media, and database queries. In some embodiments, CDN 100 can be based on CCN.

In FIG. 1, a content consumer 116 requests a piece of content using a client computer 118, which is coupled to node 108. In the case of CCN, such request is expressed by a CCN interest. The interest flows (interest flow 120) from client computer 118 to node 108, which does not have the content available. Next, the interest flows (interest flow 122) from node 108 to affiliate node 104, which is a local affiliate of the provider of the requested content (content-provider node 102), and hosts the requested content on behalf of content-provider node 102. In one embodiment, content-provider node 102 has previously provided affiliate nodes 104 and 106 copies of the produced content.

In FIG. 1, affiliate node 104 can satisfy the interest with the requested content. The flow of content (e.g., content flows 124 and 126) retraces the path of the interest flow until it reaches client computer 118, where the content is presented to the user. In a conventional CDN, affiliate nodes receive content from content providers and provide the received content "as is" to content consumers without making any changes. Affiliate nodes usually receive compensation from the content provider, which sells advertising space within its content to a centralized advertisement aggregator. In contrary, in embodiments of the present invention, affiliate nodes can insert their own advertising content into the content they're hosting before presenting this content to consumers, thus being able to receive compensation from advertisers. This arrangement provides incentive for content distributors (local affiliates) to distribute the content.

To allow local affiliates, such as affiliate node 104, to insert their own advertising content within the requested content, content-provider node 102 generates a "placeholder" link when producing the requested content. For example, when producing a video file for streaming, the content provider generates a number of content files: p.com/content/myvideo/p1, p.com/content/myvideo/p2, . . . , p.com/content/myvideo/p31, and determines locations of a number of advertising slots to be embedded in the video streaming. At those determined advertising locations, the content provider generates content files that do not contain actual video content, but contain a link, such as: p.com/content/myvideo/p15: Link: p.com/LocalAffiliate/slot1/15sec-720p, which specifies a 15-second advertising video slot that can be filled by a local affiliate. If the advertisement is in the form of a banner or pop-up window, this link will specify the format, such as the size and the location, of the banner or the pop-up window.

Client computer 118 receives requested content files along with a placeholder link from affiliate node 104 via node 108. In order to resolve the placeholder link, client computer 118 sends a request over CDN 100. When the request reaches affiliate node 104, affiliate node 104 recognizes itself as a local affiliate, and is thus able to fill the advertising slot with its own advertisement. In one embodiment, affiliate node 104 responds to the request directly with advertising content such as an advertising video clip. In one embodiment, affiliate node 104 responds to the request with another link to an associated advertiser. In the above example, the response can be a file with CCN name: p.com/LocalAffiliate/slot1/15sec-720-p/instance#; and its content (data) includes Link:/foo.com/adCampaign3. Note that the CCN name of the response matches that of the request. Client computer 118 can then resolve this link by contacting the advertiser at namespace foo.com. Note that, contrary to conventional web advertisement, where a specific entity (such as a double-clicked link) is targeted, this solution uses the placeholder link to target a class of things, and some instances of the class can supply content to resolve the placeholder link. The placeholder link does not limit the source of the advertisement as long as the advertisement is provided by a legitimate local affiliate.

It is important to establish a trust model to prevent parties other than those local affiliates specified by the content provider from inserting advertising within the content. This trust model includes two elements: first, the content provider should be able to specify which party is allowed to insert an advertisement; second, the party that inserts the advertisement needs to prove that it meets the requirements set by the content provider.

To do so, the content provider signs the original content using a signing key that is identified by the same namespace as that of the original content. In one embodiment, the signing key can be a private key used in a Public Key Infrastructure (PKI) system. The content provider distributes this private key to a legitimate affiliate, and publishes the corresponding public key. When a legitimate local affiliate receives the original content, such as broadcast video or audio stream, the original content includes a placeholder link pointed to the local affiliate. The local affiliate modifies the received content by replacing the placeholder link with its own advertisement (such as a new link to its advertisers), and signs the modified content using the private key provided by the content provider. Note that the modified content now includes either advertising content or a link to the advertising content.

When the client machine receives the modified content, the client machine checks the validity of the signature of the modified content using the corresponding public key. If the signature is valid, the client machine renders the content along with the advertisement inserted by the local affiliate. Otherwise, the client machine treats the content as erroneous, and discards the modified content.

FIG. 2A presents a diagram illustrating an exemplary CCN content stream that includes a placeholder link, in accordance with an embodiment of the present invention. CCN content stream 200 includes a number of content pieces, such as content pieces 202, 204, and 206. The CCN names for these content pieces fall within the same namespace: p.com/content/myBook. Content pieces 202 and 204 include actual data content to be presented to the content consumer, whereas the data of content piece 206 includes a placeholder link (Link: p.com/LocalAffiliate/30×20Banner), specifying that a 30×20 banner advertisement can be inserted here. Each content piece is associated with a signature, which is produced by a signing key. In one embodiment, the signature is produced by encrypting the checksum of the content packet using the signing key, which can be a private key of a public/private key pair. The key locator (or the name of the key) indicates where to locate the corresponding public key. In one embodiment, the signing key is in the same namespace of the content, indicating the signing party is the content provider. When content stream 200 is received by a client machine, the client machine uses the key locator to locate the corresponding public key, and uses the public key to verify the signature. A valid signature authenticates the source of the content. When the client machine encounters the placeholder link, it makes a request over the network for content associated with that placeholder link. In a further embodiment, the key itself (p.com/content/George), which is associated with an individual named George, can also be signed by another general key in the namespace of p.com/content.

FIG. 2B presents a diagram illustrating an exemplary response to the placeholder-link request from a local affiliate, in accordance with an embodiment of the present invention. In FIG. 2B, a content piece 208 is a local affiliate's response to the placeholder-link request. The prefix of the CCN name of the response matches the request, and the data portion of the response includes a link to a piece of advertisement (Link: foo.com/adCampaign/30×20Banner) under the namespace foo.com. Note that the format of the advertisement piece needs to comply with the request. In this case, the advertisement piece is a 30×20 banner. To prove that the local affiliate providing this response is legitimate, this local affiliate signs the response using a key provided by the content provider. In this case, the signing key used to sign content piece 208 is also in the same namespace of the original content, in this case, p.com. Similarly, this signing key can also be singed by the general key in the namespace of p.com/content. Note that this general key has been previously distributed to the local affiliate by the content provider. Hence, by verifying the signature of the affiliate key using the general key, the client machine authenticates the affiliate key. In addition, by verifying the signature of the response, the client machine authenticates the response as a response from a legitimate local affiliate. As one can see, an authentication chain has been formed using the signing keys produced by the content providers to ensure the authenticity of the inserted advertising link. In one embodiment, the local affiliate may provide advertising content directly. In such a case, the authenticity of the advertisement is verified according to the authentication chain.

In addition to providing a link to the advertisement, in one embodiment, the local affiliate can also notify the content consumer that the advertisement should be signed by a key associated with the advertiser. In the example shown in FIG. 2B, content piece 208 specifies that the advertisement is signed by a key in the advertiser's namespace. When the client machine retrieves the advertisement, the client machine verifies the signature of the advertising content using the key specified by the local affiliate, thus ensuring that the advertising space is filled only by the party contracted to do so by the local affiliate. This extends the authentication chain to allow advertising content received from the advertiser to be authenticated.

Figure 3:
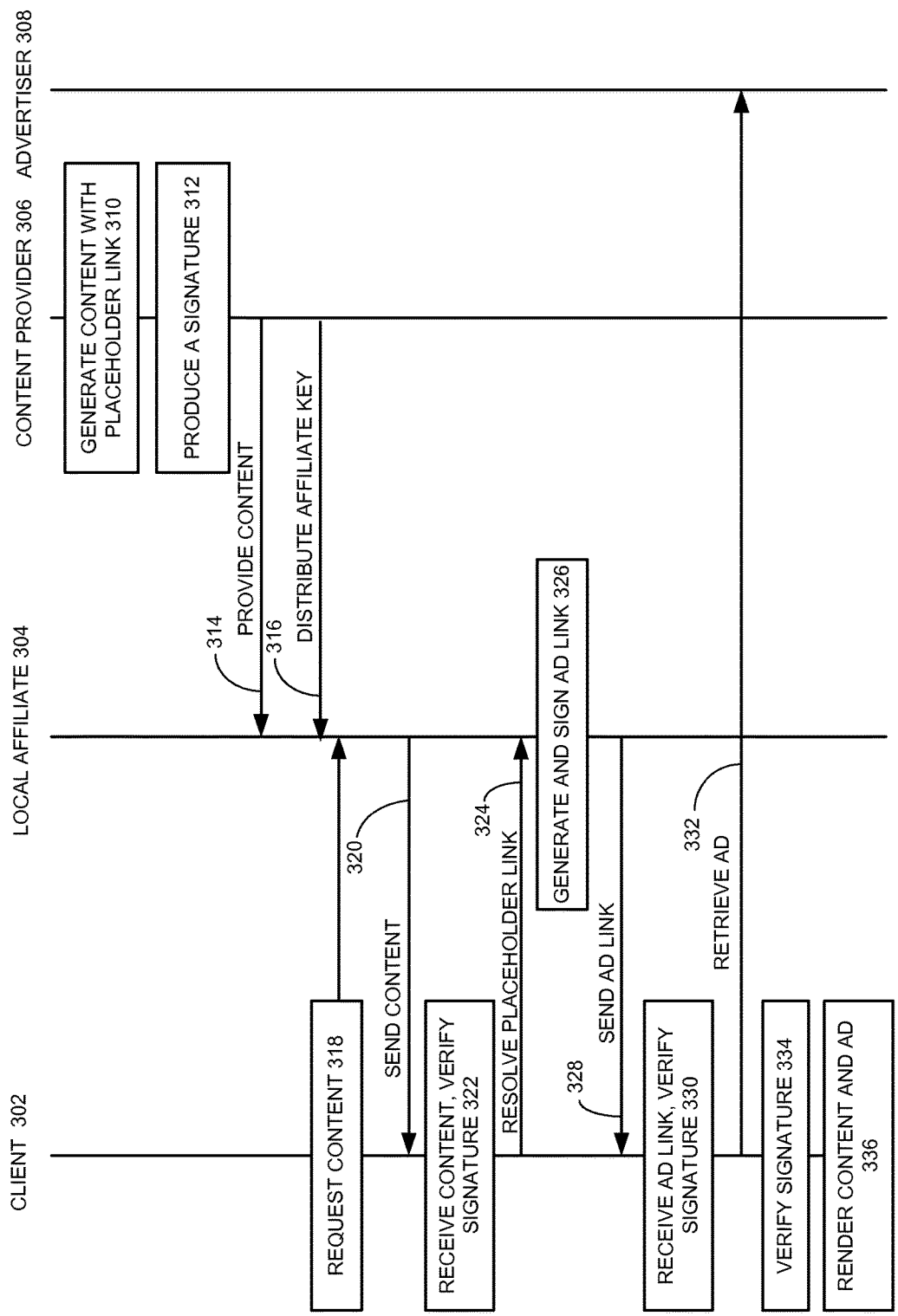
FIG. 3 presents a time-space diagram illustrating the process of distributing advertising to a client, in accordance with an embodiment of the present invention.

FIG. 3 presents a time-space diagram illustrating the process of distributing advertising to a client, in accordance with an embodiment of the present invention. During operation, a content provider 306 generates online content with an embedded placeholder link associated with placement of an advertisement (operation 310), and produces a signature for the content packet using a provider's private key (operation 312). The format (such as the size and location of a banner or the duration and position of a video/audio clip) of the advertisement is specified by content provider 306, so that content provider 306 can dictate the appearance of the web content. Note that content provider 306 may want the presentation of the content to be similar to all consumers (in terms of where and when the advertisements are inserted) regardless of which local affiliate provides the advertisements to the consumers. In one embodiment, the format specification is included in the placeholder link. Content provider 306 provides the content to a local affiliate 304 (operation 314), and distributes an affiliate key to local affiliate 304 (operation 316). The local affiliate can be any entity that hosts the content. Note that different local affiliates can be associated with different affiliate keys. In one embodiment, the affiliate key is also signed by content provider 306.

Subsequently, a client 302 may send a request over the network for the content (operation 318), and local affiliate 304 sends the content packet to client 302 (operation 320). Client 302 receives the content packet and verifies the signature of the content packet using a corresponding provider's public key (operation 322). By verifying this signature, client 302 authenticates the source of the content packet as content provider 306. Client 302 then resolves the placeholder link by sending a request to local affiliate 304 (operation 324). In response to receiving the request, local affiliate 304 generates a response packet that includes a link to an advertisement, and signs the response packet using the affiliate key (operation 326). In one embodiment, the affiliate key is the private key of a public/private key pair. Local affiliate 304 parses the request to determine the advertisement format specified by content provider 306, and identifies a link to an advertisement that satisfies the requested format. In a further embodiment, local affiliate 304 notifies client 302 of the signing key used to sign the advertising content. Note that local affiliate 304 can obtain such information from its contracted advertisers beforehand. Subsequently, local affiliate 304 sends the advertising link to client 302 (operation 328).

Client 302 receives the advertising link and verifies its signature (operation 330). In one embodiment, client 302 retrieves the public key (e.g., in the same namespace of the provided content) associated with the affiliate key in order to verify the signature of the advertising link. By verifying this signature, client 302 authenticates the source of the advertising link (local affiliate 304) as a legitimate affiliate of content provider 306. Subsequently, client 302 follows the advertising link to retrieve the advertisement from an advertiser 308 (operation 332). Client 302 verifies the signature of the advertisement in order to authenticate that the source of the advertisement is the one specified by local affiliate 304 (operation 334). Client 302 then renders the content along with the advertisement to allow the presentation to the content consumer (operation 336). Note that, in some embodiments, to successfully render the content, client 302 needs to check the validity of all signatures, including the signatures of the content, the advertising link, and the advertisement. Any signature error may result in client 302 discarding the content. In a further embodiment, client 302 may render the content as long as the signatures of the content and the advertising link are verified. In such a scenario, signature error of the advertisement only results in the advertisement not being presented, whereas the presentation of the content itself is not affected.

Figure 4:
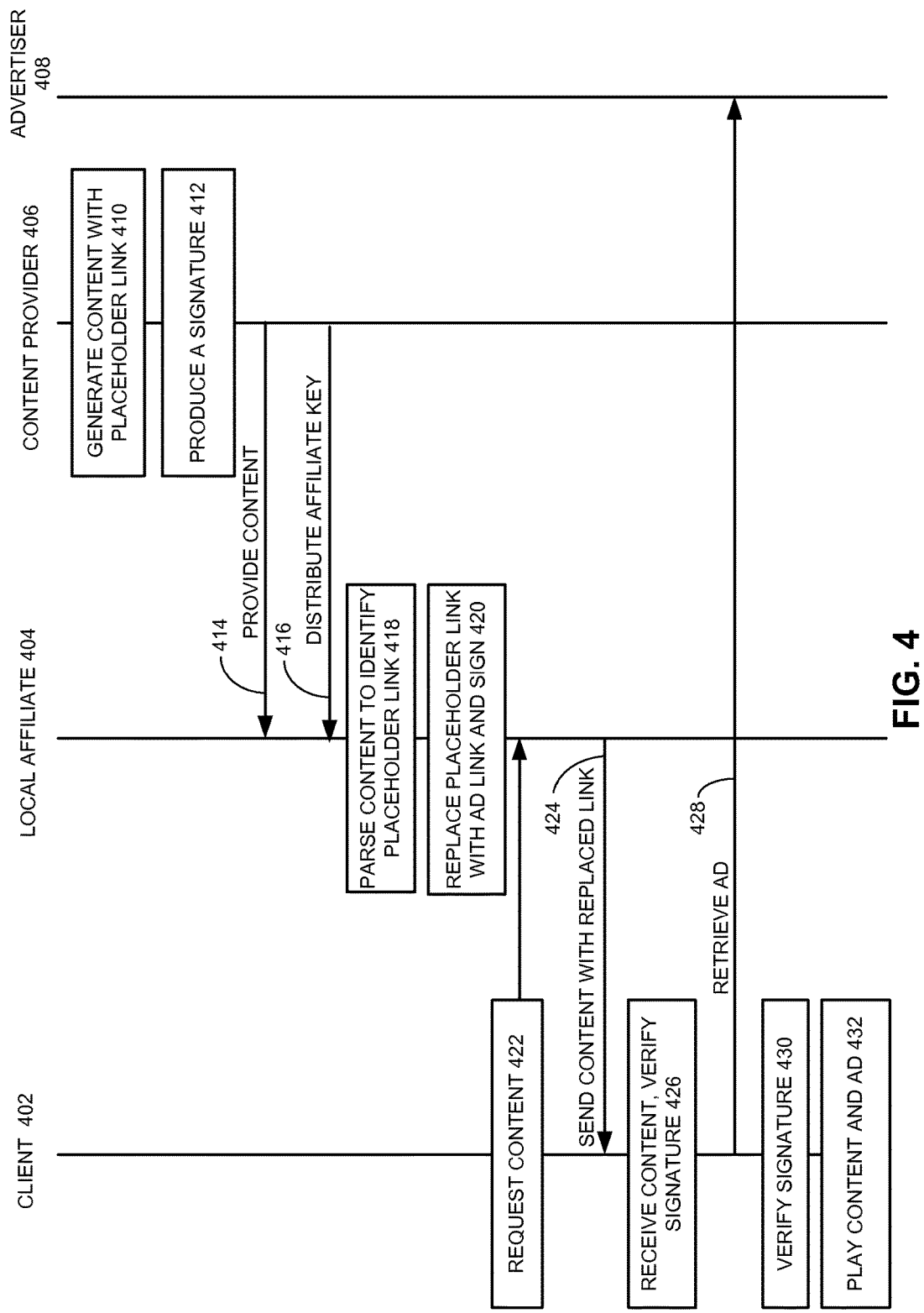
FIG. 4 presents a time-space diagram illustrating the process of distributing advertising to a client along with streaming media, in accordance with an embodiment of the present invention.

FIG. 3 presents a scenario that is similar to the presentation of a web page, where advertising is presented inside the web page along with the desired content. In cases of online video/audio streaming, the advertisement is delivered to the consumer using a slightly different manner. FIG. 4 presents a time-space diagram illustrating the process of distributing advertising to a client along with streaming media, in accordance with an embodiment of the present invention. During operation, a content provider 406 generates media content with embedded placeholder link (operation 410), and signs the content packet (operation 412). Content provider 406 provides the content to a local affiliate 404 for distribution (operation 414), and distributes an affiliate key to local affiliate 404 (operation 416).

A local affiliate parses the media content, and identifies that there is an embedded placeholder link (operation 418). Local affiliate 404 then replaces the placeholder link with a link to its own advertisement, such as a link to a contracted advertiser, and signs the modified content using the affiliate key (operation 420). A client 402 requests the content over the network (operation 422). Local affiliate 404 receives the request and sends the content with the advertising link to client 402 (operation 424). Client 402 receives the content, and verifies the signature of the content (operation 426). By verifying the signature, client 402 authenticates the source of the modified content as a legitimate affiliate of content provider 406. Client 402 follows the advertising link to retrieve the advertisement from an advertiser 408 (operation 428), and verifies the signature of the advertisement (operation 430). Subsequently, client 402 plays the media content along with the advertisement (operation 432).

Note that the difference between the process shown in FIG. 3 and the process shown in FIG. 4 is that in FIG. 3 the advertising link is "pulled" by the client from the local affiliate, whereas in FIG. 4 the advertising link is "pushed" from the local affiliate to the client.

Figure 5:
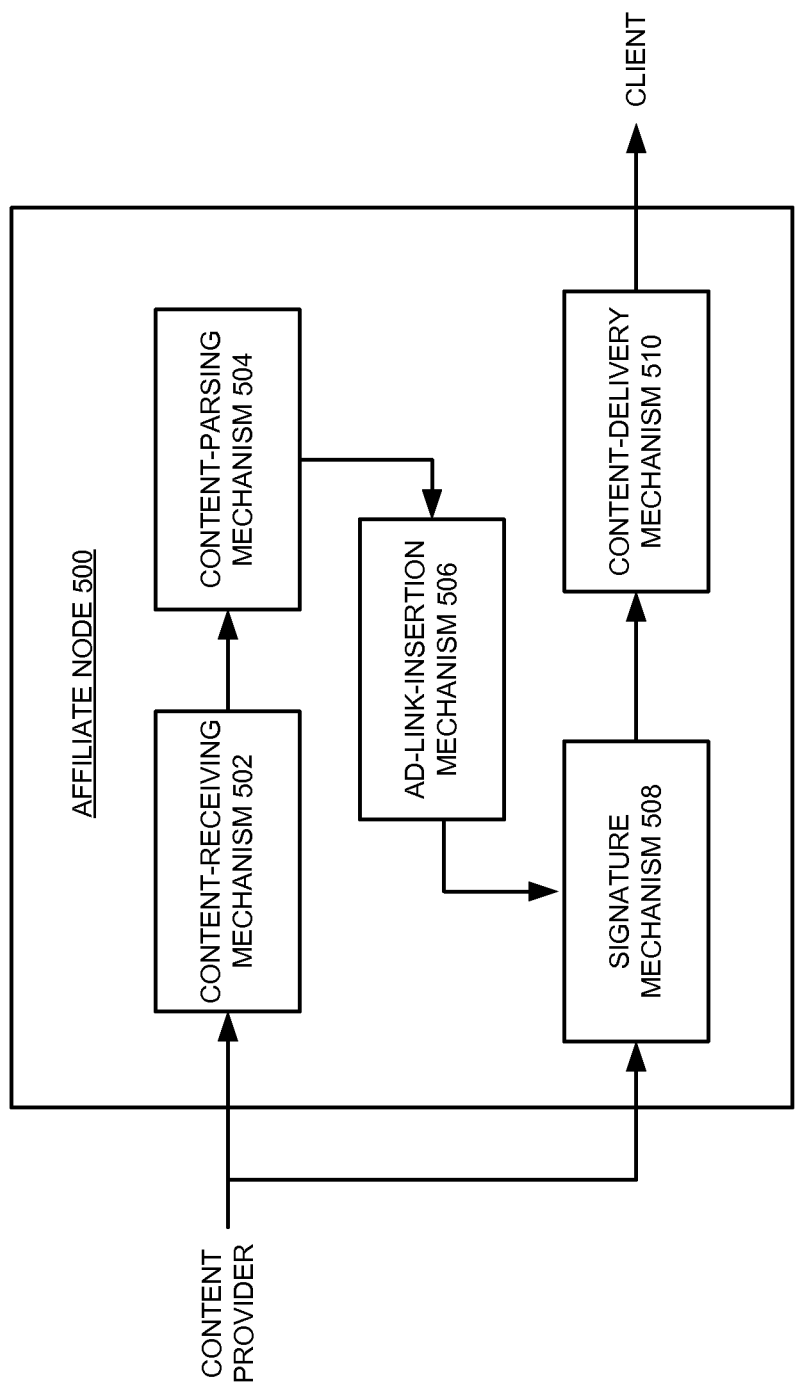
FIG. 5 presents a diagram illustrating the architecture of an exemplary affiliate node in accordance with an embodiment of the present invention.

FIG. 5 presents a diagram illustrating the architecture of an exemplary affiliate node in accordance with an embodiment of the present invention. Affiliate node 500 includes a content-receiving mechanism 502, a content-parsing mechanism 504, an advertisement-link-insertion mechanism 506, a signature mechanism 508, and a content-delivery mechanism 510.

During operation, content-receiving mechanism 502 receives content from the content provider. Content-parsing mechanism 504 parses the content to identify an embedded placeholder link, and advertisement-link-insertion mechanism 506 inserts an advertisement into the content to replace the placeholder link. Signature mechanism 508 signs the content with the advertising link using a signing key received from the content provider. Content-delivery mechanism 510 delivers the content with the advertising link to a client.

Note that unlike the conventional model in which an advertisement aggregator is used to distribute advertisements, embodiments of the present invention allow distributed advertising distribution. In other words, advertisements can now be sold and distributed by entities that are responsible for the distribution of the content, thus providing incentives to those entities (which are not centralized advertisement aggregators) for hosting and distributing the content. A trust model can be established among the content producer, the content distributor (local affiliate), and the content consumer using a chain of digital signatures. Per the trust model, only legitimate content distributors are allowed to insert advertising into advertising slots that are determined by the content producers.

Computer and Communication System

Figure 6:
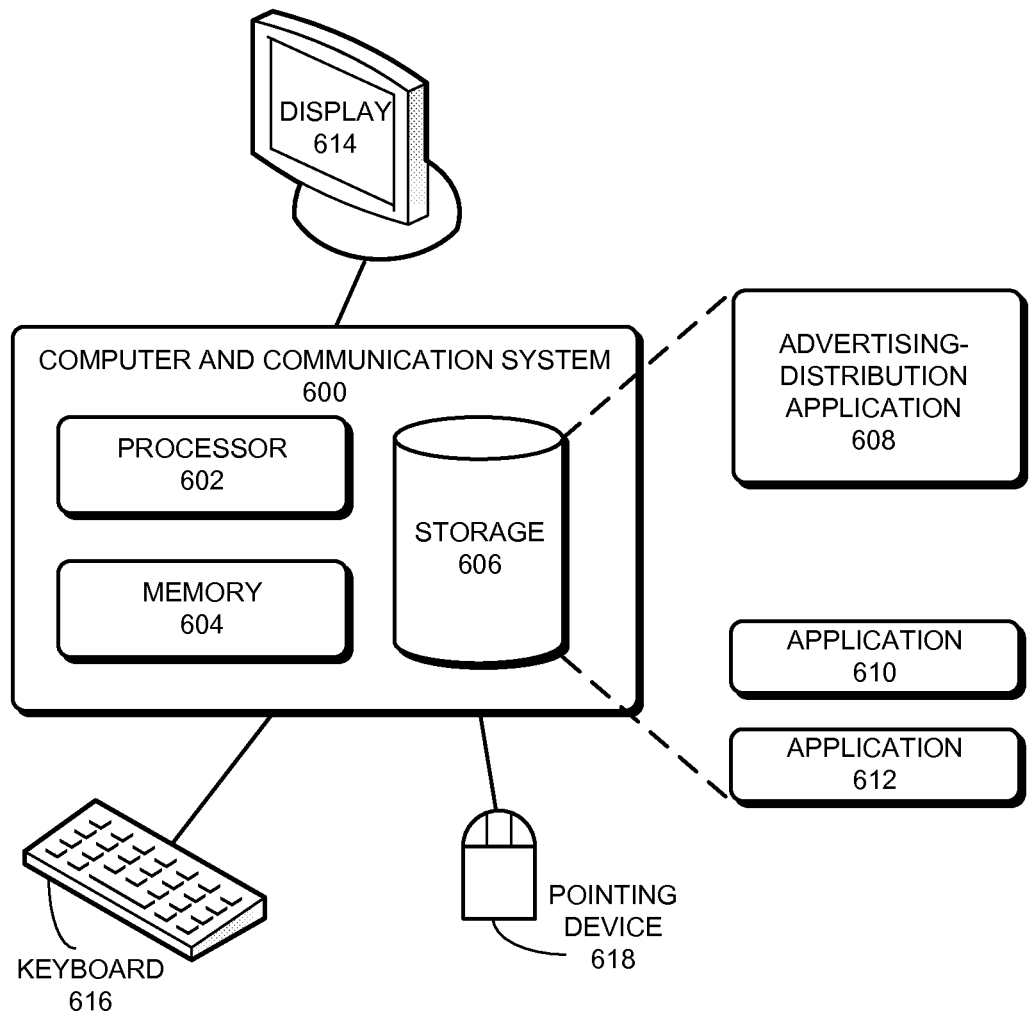
FIG. 6 presents an exemplary computer system for facilitating distributed advertising distribution in accordance with an embodiment of the present invention.

FIG. 6 presents an exemplary computer system for facilitating distributed advertising distribution in accordance with an embodiment of the present invention. In FIG. 6, a computer and communication system 600 includes a processor 602, a memory 604, and a storage device 606. Storage device 606 stores programs to be executed by processor 602. Specifically, storage device 606 stores an advertising-distribution application 608, as well as other applications, such as applications 610 and 612. During operation, advertising-distribution application 608 is loaded from storage device 606 into memory 604 and then executed by processor 602. While executing the program, processor 602 performs the aforementioned functions. Computer and communication system 600 is coupled to an optional display 614, keyboard 616, and pointing device 618.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for facilitating delivery of advertisements over a Content-Centric Network, comprising:

receiving, by a computing device implementing an affiliate network node in the Content-Centric Network, a content piece from a content producer, wherein the affiliate network node that receives the content piece is not the same as the content producer from which the content piece originated, and wherein the content piece includes a placeholder name prefix associated with a predetermined advertising slot;

modifying, by the affiliate network node, the content piece by replacing the placeholder name prefix with a name prefix of an advertisement or a name prefix associated with an advertiser;

hosting the modified content piece at the computing device implementing the affiliate network node for distribution to one or more clients;

receiving a request over the Content-Centric Network for the content piece from a client; and delivering, by the affiliate network node, the modified content piece to the client over the Content-Centric Network.

2. The method of claim 1, further comprising: receiving a signing key from the content producer; and producing a signature for the modified content piece using the signing key.

3. The method of claim 1, wherein the advertisement includes at least one of:
a banner;
a pop-up window;
a video clip; and
an audio clip.

4. The method of claim 1, wherein the placeholder name prefix specifies a format for the advertisement associated with the predetermined advertising slot, and wherein modifying the content piece by replacing the placeholder name prefix with the name prefix of the advertisement or a name prefix associated with an advertiser comprises:
modifying the content piece by replacing the placeholder name prefixwith the name prefix of the advertisement or the link thereto that satisfies the format specified by the placeholder name prefix.

5. The method of claim 1, wherein the affiliate network node selects at least one of the advertisement or the advertiser.

6. A computer-executable method for facilitating delivery of an advertisement over a Content-Centric Network, comprising:
hosting a content piece for distribution to one or more clients, by an affiliate network node, wherein the content piece is produced by a content producer and the affiliate network node that hosts the content piece is not the same as the content producer from which the content piece originated, wherein the content piece is embedded with a placeholder name prefix associated with a predetermined advertising slot, and wherein the affiliate network node is associated with the name prefix of the placeholder;
delivering, by the affiliate network node, the content piece including the embedded placeholder name prefix to a client over the Content-Centric Network;
receiving a request from the client corresponding to the placeholder name prefix;
determining a name prefix of an advertisement or a name prefix of an advertiser that is to serve the advertisement that matches the predetermined advertising slot based on the request;
generating, by the affiliate network node, a response packet that includes the name prefix of the advertisement or the name prefix of the advertiser; and
returning, by the affiliate network node, the response packet, which includes the name prefix of the advertisement or the advertiser, to satisfy the request from the client.

7. The method of claim 6, further comprising:
receiving a signing key from the content producer; and
producing a signature for the advertisement or the link using the signing key.

8. The method of claim 6, wherein the advertisement includes at least one of:
a banner;
a pop-up window;
a video clip; and
an audio clip.

9. The method of claim 6, wherein the placeholder name prefix specifies a format for the advertisement associated with the predetermined advertising slot, and wherein determining the name prefix of the advertisement or a name of an advertiser that is to serve the advertisement that matches the predetermined advertising slot based on the request comprises:
determining the name prefix of the advertisement or the link thereto that satisfies the format specified by the placeholder name prefix and matches the predetermined advertising slot based on the request.

10. The method of claim 6, wherein the affiliate network node selects at least one of the advertisement or the advertiser.

11. A non-transitory computer-readable storage medium storing instructions that when executed by a computer cause the computer to perform a method, the method comprising:
receiving, by an affiliate network node in a Content-Centric Network, a content piece from a content producer, wherein the affiliate network node that receives the content piece is not the same as the content producer from which the content piece originated, and wherein the content piece includes a placeholder name prefix associated with a predetermined advertising slot;
modifying, by the affiliate network node, the content piece by replacing the placeholder name prefix with a name prefix of an advertisement or a name prefix associated with an advertiser;
hosting the modified content piece at the affiliate network node for distribution to one or more clients;
receiving a request over the Content-Centric Network for the content piece from a client; and
delivering, by the affiliate network node, the modified content piece to the client over the Content-Centric Network.

12. The computer-readable storage medium of claim 11, wherein the method further comprises:
receiving a signing key from the content producer; and
producing a signature for the modified content piece using the signing key.

13. The computer-readable storage medium of claim 11, wherein the advertisement includes at least one of:
a banner;
a pop-up window;
a video clip; and
an audio clip.

14. The computer-readable storage medium of claim 11, wherein the placeholder name prefix specifies a format for the advertisement associated with the predetermined advertising slot, and wherein modifying the content piece by replacing the placeholder name prefix with the name prefix of the advertisement or a name prefix associated with an advertiser comprises:
modifying the content piece by replacing the placeholder name prefix with the name prefix of the advertisement or the link thereto that satisfies the format specified by the placeholder name prefix.

15. The computer-readable storage medium of claim 11, wherein the affiliate network node selects at least one of the advertisement or the advertiser.

16. A non-transitory computer-readable storage medium storing instructions that when executed by a computer cause the computer to perform a method, the method comprising:
hosting a content piece for distribution to one or more clients-over a Content-Centric Network, by an affiliate network node, wherein the content piece is produced by a content producer and the affiliate network node that hosts the content piece is not the same as the content producer from which the content piece originated, wherein the content piece is embedded with a placeholder name prefix associated with a predetermined advertising slot, and wherein the affiliate network node is associated with the name prefix of the placeholder;

delivering, by the affiliate network node, the content piece including the embedded placeholder name prefix to a client over the Content-Centric Network;

receiving an inquiry from the client about the placeholder name prefix;

determining a name prefix of an advertisement or a name prefix of an advertiser that is to serve the advertisement that matches the predetermined advertising slot;

generating, by the affiliate network node, a response packet that includes the name prefix of the advertisement or the name prefix of the advertiser; and returning, by the affiliate network node, the response packet, which includes the name prefix of the advertisement or the advertiser, to satisfy the request from the client.

17. The computer-readable storage medium of claim 16, wherein the method further comprises:

receiving a signing key from the content producer; and producing a signature for the advertisement or the link using the signing key.

18. The computer-readable storage medium of claim 16, wherein the advertisement includes at least one of:
    a banner;
    a pop-up window;
    a video clip; and
    an audio clip.

19. The computer-readable storage medium of claim 16, wherein the placeholder name prefix specifies a format for the advertisement associated with the predetermined advertising slot, and wherein determining the name prefix of the advertisement or a name of an advertiser that is to serve the advertisement that matches the predetermined advertising slot based on the request comprises:

determining the name prefix of the advertisement or the link thereto that satisfies the format specified by the placeholder name prefix and matches the predetermined advertising slot based on the request.

20. The computer-readable storage medium of claim 16, wherein the affiliate network node selects at least one of the advertisement or advertiser.

* * * * *